United States Patent [19]
Popp et al.

[11] Patent Number: 5,456,085
[45] Date of Patent: Oct. 10, 1995

[54] PROCESS AND APPARATUS FOR CRYOGENICALLY CLEANING RESIDUE FROM CONTAINERS AND REDUCING THE BULK VOLUME THEREOF

[76] Inventors: James L. Popp; Carolyn Popp, both of 55 Winthrop Rd., Aurora, Ill. 60506

[21] Appl. No.: 206,731

[22] Filed: Mar. 7, 1994

[51] Int. Cl.⁶ .......................... F25D 17/02; B02C 11/08; B08B 7/04
[52] U.S. Cl. .................. 62/64; 62/52.1; 62/373; 134/17; 241/65; 241/DIG. 37
[58] Field of Search ................ 62/62, 64, 52.1, 62/373; 134/17; 241/DIG. 37, 65

[56] References Cited

U.S. PATENT DOCUMENTS

| | | | |
|---|---|---|---|
| 2,609,150 | 9/1952 | Bludeau | 241/15 |
| 2,735,624 | 2/1956 | Beck | 241/17 |
| 2,919,862 | 1/1960 | Beike et al. | 241/23 |
| 2,951,351 | 9/1960 | Snelling | 62/64 X |
| 3,096,626 | 7/1963 | Morrison | 62/64 X |
| 3,101,757 | 8/1963 | Hanson | 62/64 X |
| 3,255,597 | 6/1966 | Carter, Jr. | 62/64 X |
| 3,316,726 | 5/1967 | Pauliukonis | 62/52.1 |
| 3,614,001 | 10/1971 | Beike | 241/23 |
| 3,643,873 | 2/1972 | George | 241/3 |
| 3,666,185 | 5/1972 | Williams | 241/DIG. 37 X |
| 3,771,729 | 11/1973 | Frable | 241/65 |
| 3,878,787 | 4/1975 | Lightstone et al. | 102/23 |
| 3,914,953 | 10/1975 | Miller | 62/63 |
| 3,934,379 | 1/1976 | Braton et al. | 51/319 |
| 4,043,019 | 8/1977 | Schroder | 29/427 |
| 4,073,443 | 2/1978 | Danioni | 241/65 |
| 4,084,387 | 4/1978 | Schorsch et al. | 62/63 |
| 4,175,396 | 11/1979 | Miller et al. | 62/374 X |
| 4,273,294 | 6/1981 | Hollely et al. | 241/18 |
| 4,342,647 | 8/1982 | McMillan et al. | 241/DIG. 37 X |
| 4,409,034 | 10/1983 | Williams | 134/4 |
| 4,483,488 | 11/1984 | Luff et al. | 241/23 |
| 4,491,484 | 1/1985 | Williams | 134/4 |
| 4,554,025 | 11/1985 | Burke et al. | 134/17 |
| 4,589,203 | 5/1986 | Le Diouron | 29/829 |
| 4,627,197 | 12/1986 | Klee et al. | 51/319 |
| 4,692,982 | 9/1987 | Rice | 29/402.09 |
| 4,705,574 | 11/1987 | Burckhardt et al. | 62/64 X |
| 4,739,625 | 4/1988 | Buchmuller et al. | 62/373 X |
| 4,768,535 | 9/1988 | Marx et al. | 134/169 R |
| 5,011,087 | 4/1991 | Richardson et al. | 241/65 X |
| 5,025,632 | 6/1991 | Spritzer | 62/64 |
| 5,044,129 | 9/1991 | Olevitch | 51/322 |
| 5,203,511 | 4/1993 | Ondush et al. | 241/5 |
| 5,271,234 | 12/1993 | Carter et al. | 62/64 |

FOREIGN PATENT DOCUMENTS

| | | |
|---|---|---|
| 2359118 | 7/1974 | Germany . |
| 52-1979 | 1/1977 | Japan . |
| 1546142 | 2/1990 | U.S.S.R. . |

OTHER PUBLICATIONS

McGraw—Hill Encyclopedia of Science & Technology, vol. 4, pp. 542–551 (6th ed., 1987).

*Primary Examiner*—Christopher Kilner
*Attorney, Agent, or Firm*—Willian Brinks Hofer Gilson & Lione

[57] ABSTRACT

A method and apparatus for the cleaning of residue from the surface of a container where the method comprises cooling a container and residue adhered to the container surface to a low temperature, substantially embrittling the residue and then impacting the container to fragment and separate the residue from the surface of the container. The cooling may be effected by contacting cold vaporized cryogen to the residue and container in an insulated box having a cryogen sprayer, an opening, and a door. A method for reducing the bulk volumes of containers comprising cooling the container to a low temperature to substantially embrittle the container and then stressing the container to fracture and break apart the embrittled portions and thereby reduce the bulk volume of the container.

48 Claims, 5 Drawing Sheets

PROCESS AND APPARATUS FOR CRYOGENICALLY CLEANING RESIDUE FROM CONTAINERS AND REDUCING THE BULK VOLUME THEREOF

BACKGROUND OF THE INVENTION

The present invention generally relates to the removal of residual materials from containers for disposal or recycling. More specifically, the present invention relates to a method and apparatus for cleaning residues from the surface of containers by the use of low temperatures. In addition, the present invention relates to a method and apparatus for reducing the bulk volume of containers by the use of low temperatures.

The disposal of wastes has become a great concern due to the environmental problems associated with hazardous materials. Of even more immediate concern are the economic problems associated with rising costs and reduced capacity of landfills, as well as the tighter governmental regulations facing waste generators. Consequently, disposal of containers and the residual materials remaining therein can be a costly and time consuming endeavor. Emphasis has been placed on cleaning the residues from the containers so that only the residues, and not the containers, are subject to costly hazardous waste disposal. This leaves the containers available to be reused, recycled, or disposed of in a less expensive non-hazardous waste landfill.

The U.S. government has established guidelines under the Resource Conservation and Recovery Act (RCRA) that specify the cleanliness requirements for disposal of containers as non-hazardous waste. Nevertheless, some states are imposing bans on the disposal of even clean containers in landfills as a remedy for rapidly diminishing landfill capacity. This leaves reuse or recycling of the containers as the only alternative.

A broad range of residues of expended commodities are subject to costly hazardous waste disposal. Some of these residues include, but are not limited to tars, lubricants, mastics, inks, coatings, solvents, adhesives, sealants, paints, etc. A range of traditional cleaning methods exists to remove such residues from commodity containers. These methods include applying water, steam, soaps, detergents, chemical solvents, abrasives and scrubbing equipment. All of these methods result in an increased volume of waste being created that may be more difficult to dispose of than the original residue. These methods may be costly due to the need of expensive materials, equipment and intensive labor. Even if the residue is not considered hazardous, there may be restrictions imposed by municipal sewage districts that require expensive pretreatment before the residue and wash liquid may be discharged into the sewage drains.

As an example of traditional cleaning methods, chemical solvent based cleaning involves numerous disadvantages. The solvents are expensive. They require special care and handling because of their combustibility, corrosiveness and/ or volatility. Special ventilation equipment may be required to recover the volatile organic compounds which vaporize during use. Additional equipment may be needed to separate the solvent from the residue waste wash for recycling of the solvent. If not separated, the volume of the waste product is greatly increased. Employees require additional training to safely handle the equipment and materials. Special inspections, building codes and zoning requirements may be difficult to comply with, or require that special facilities be constructed for the cleaning equipment. In the end, most small organizations do not have the resources to properly handle the problems associated with disposing or recycling residue laden containers using traditional methods.

Even when the commodity containers are clean, the sheer bulk volume of the containers may make their disposal or recycling problematic. Storage and transportation costs are related to the bulk volume of the freight. Apparatus exists for the size reduction. This equipment is available for application to reduce the bulk volume of containers. However, this equipment is not without certain disadvantages.

Typically, the bulk volume of plastic containers is reduced by shredding the containers. Shredding equipment may be highly dangerous to operate, exposing personnel to severe injury if improperly used. The machinery may also be very expensive and require significant maintenance.

On the other hand, the bulk volume of metal containers is commonly reduced by compacting or crushing. This equipment may be less expensive than shredding machinery and safer to operate. The equipment applies a compressive force to crush and permanently deform the metal containers.

Unfortunately, compacting equipment designed to crush metal containers may not work satisfactorily with plastic containers having a degree of elasticity. Generally, plastic containers have a tendency to partially rebound to their original shape after the compressive forces are released. When a plastic container is removed from the compactor, it would return to near its original bulk volume.

Therefore, for the foregoing reasons, there is a need for a method and or apparatus for treating plastic containers so that they maintain a reduced bulk volume after release of compression forces that is safe, simple and cost effective.

In addition, there exists a sizable gap between existing traditional cleaning methods to remove residue from containers and the requirements of industry to clean containers with a cost effective, environmentally safe process. Therefore, there exists the need for a method and apparatus for cleaning residues from containers that does not have the inefficiencies, hazards and environmental liabilities associated with traditional cleaning methods.

SUMMARY OF THE INVENTION

Accordingly, the present invention is directed to provide a simple, cost effective, environmentally safe method and apparatus for the cleaning of residues of expended commodities from the surfaces of commodity containers. In an aspect of the invention, the method involves cooling a residue laden container to a temperature where the residue becomes embrittled and then impacting the container to cause the residue to fragment and separate from the container. Preferably, the container is cooled by placing it in an insulated box and contacting it with a cold cryogenic vapor.

Another aspect of the invention provides a safe, simple, cost effective method and apparatus for the treating of a container to reduce its bulk volume. In particular, the method involves cooling a container to a temperature where the container becomes embrittled and then applying forces to fragment and break apart the container, thereby, permanently reducing its bulk volume. Preferably, the container is cooled by placing it in an insulated box and contacting it with cold cryogenic vapor.

The preferred embodiments of the invention avoid the use of solvents and other wash liquids so that the hazardous material for disposal is limited to the original residue itself.

These embodiments also require less equipment and less labor to operate than traditional methods of cleaning and reduces health risks to the operating personnel. The preferred embodiments substantially remove the residues from the container to meet U.S. government disposal requirements and industry requirements for re-use of the container.

In addition, the preferred embodiment of the invention allows plastic containers to be reduced in bulk volume using traditional equipment designed for metal containers. The present invention may also permit the crushing of metal containers with less force than would normally be required. Further advantages of the present invention will be apparent from the accompanying drawings and the detailed description of the invention.

DETAILED DESCRIPTION OF THE DRAWINGS AND PRESENTLY PREFERRED EMBODIMENTS

Figure 4:
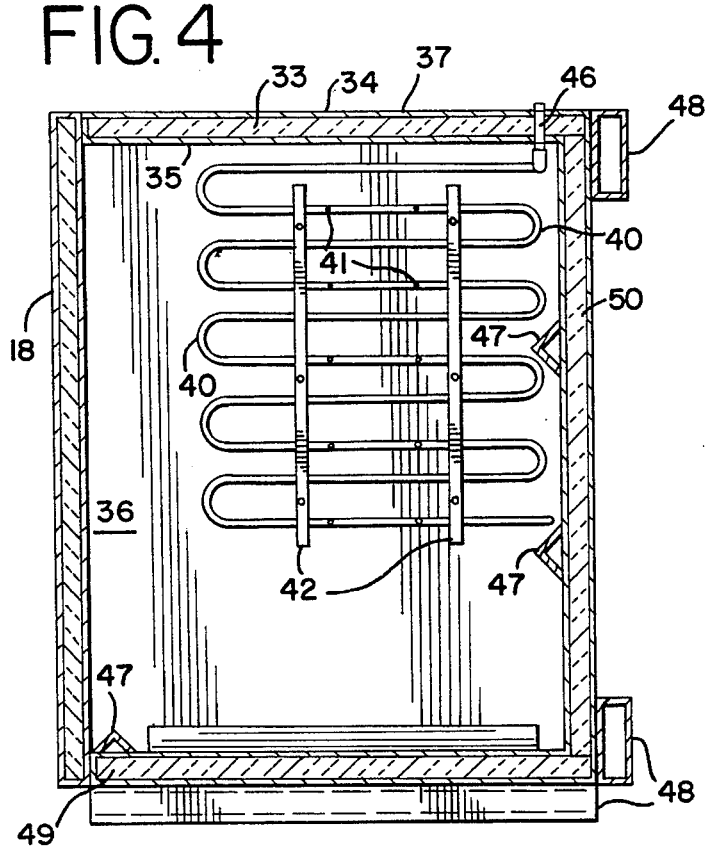
FIG. 4 is a side cross-sectional view of the insulated box of FIG. 1.
Figure 5:
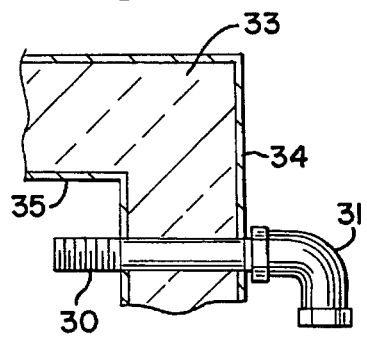
FIG. 5 is an enlarged side cross-sectional view taken along line 5—5 of FIG. 2 showing the detail of the vent port.
Figure 6:
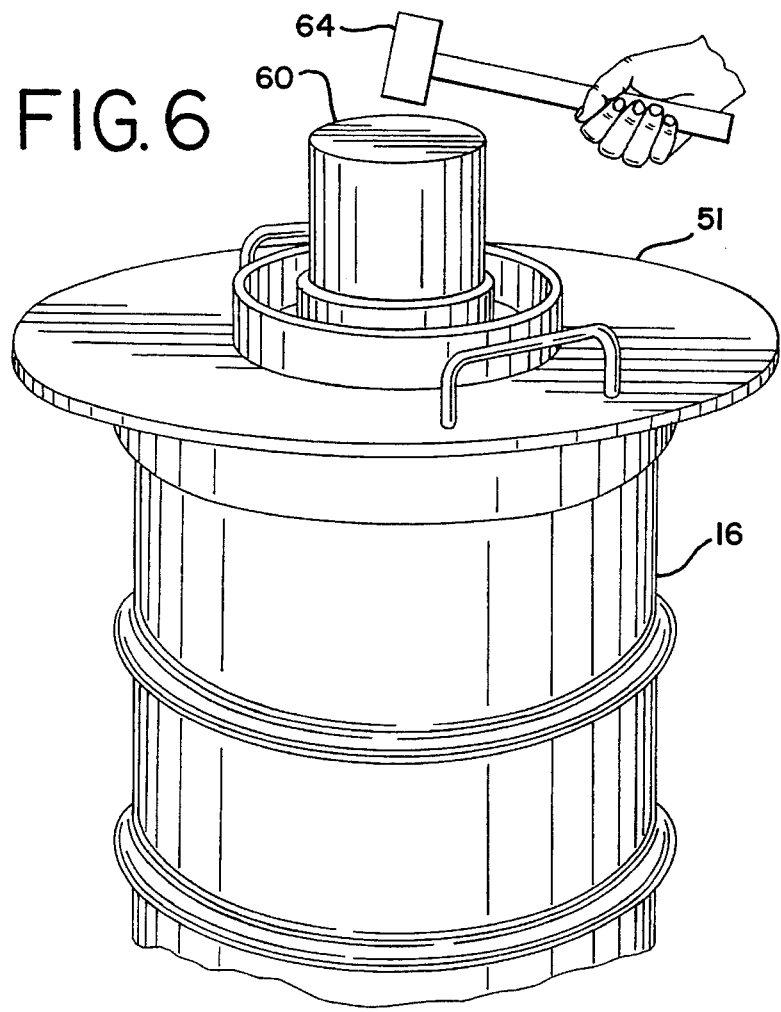
FIG. 6 is a perspective view of one embodiment of a preferred receptacle cover in operation with a residue receptacle, an impacting device and a container.

A preferred embodiment of the system used to cryogenically clean residue from a container is depicted in FIGS. 1 through 7. The system comprises an insulated box 10, a liquid cryogen storage tank 12, interconnecting cryogen hose 14, an impacting device (FIG. 6) and a residue receptacle 16 (FIG. 6).

As shown in FIGS. 1 through 5, a preferred embodiment of the insulated box 10 includes a pivotably mounted door 18 covering an opening 22 located on the front side of the box 10, a temperature gauge 26, a vent port 30, and two cryogen sprayers 38 and 63.

As most easily seen in FIG. 4, the insulated box 10 is made of interior walls 35 and exterior walls 34 with a layer of insulation 33 between the walls. The interior and exterior walls 35 and 34 may be made of a variety of commercially available durable materials, such as, but not limited to, mild steel, aluminum, stainless steel or galvanized steel. Likewise, the insulation 33 may be a variety of commercially available materials such as, but not limited to, fiberglass or expanded polystyrene. The box 10 has a back wall 50, two opposing side walls 36, a top wall 37, a bottom wall 49 and a front side opening 22.

Figure 1:
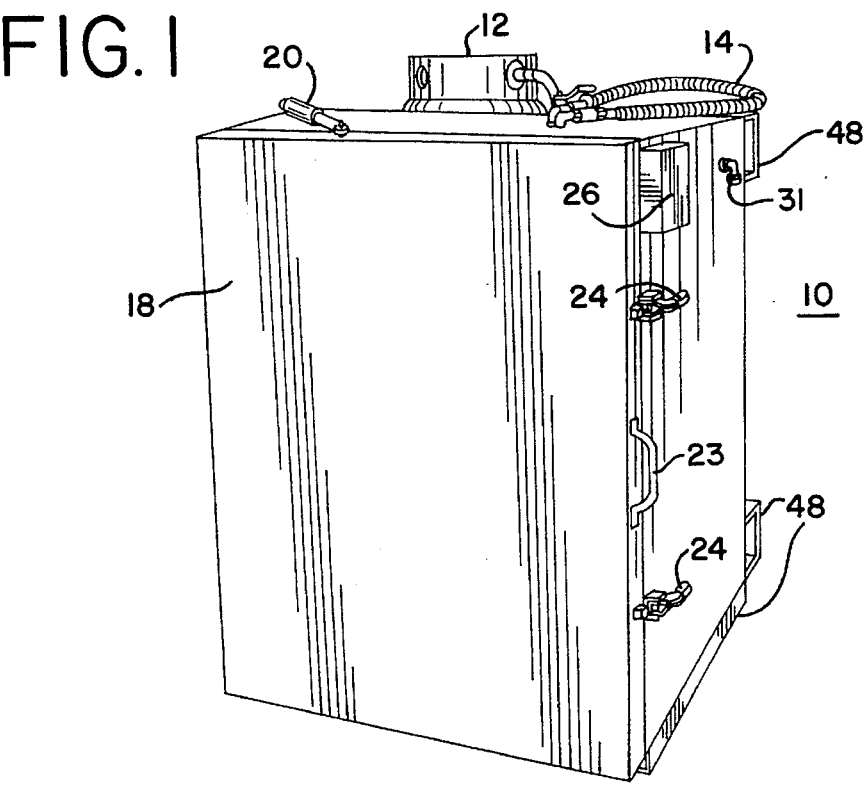
FIG. 1 is a perspective view of one embodiment of the apparatus of the present invention including an insulated box having a side opening.

As shown in FIG. 1, the door 18 has a handle 23, latches 24 and a gas spring 20. The door 18 is pivotably mounted on hinges connected to a side wall 36 opposite the handle 23. The gas spring 20 movably connects the top of the door 18 to the top of the box 10 such that the gas spring 20 pulls the door 18 to a closed position. As described in detail below, the door 18 and walls of the box 10 have gaskets 75 and 76 (described in detail below and shown in FIG. 10) placed along the perimeter to seal the box 10 when door 18 is closed.

The box 10 also includes two fork lift pockets 48 along the bottom wall 49 to assist in transport of the box 10 by fork lift.

Figure 3:
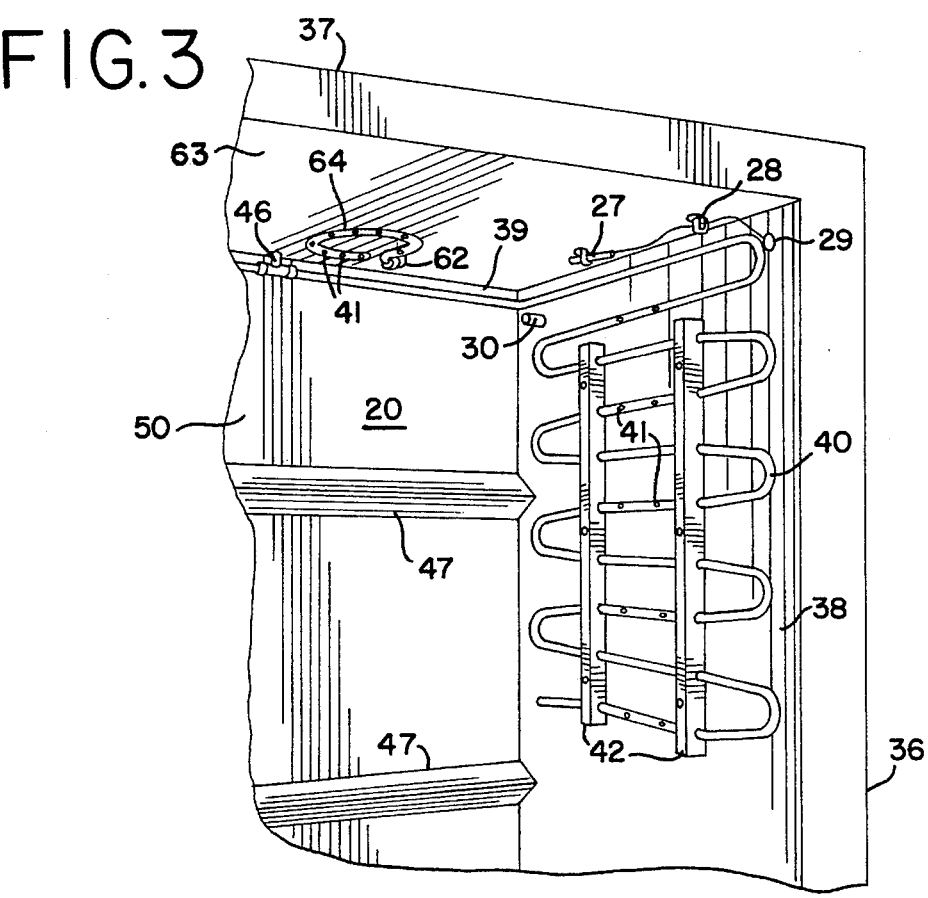
FIG. 3 is a perspective view of the interior of the insulated box of FIG. 1.

In addition, as shown in FIGS. 3 and 4, the box 10 includes a plurality of spacers 47 located in the interior of the box 10 along the bottom wall 49 and the back wall 50. These spacers 47 keep the containers from being placed directly against the walls 49 and 50 to allow cold vapor circulation around the containers placed therein. The spacers 47 on the bottom wall 49 (FIG. 4) also keep the containers raised above any liquid cryogen that may have collected at the bottom of the box 10.

A temperature gauge 26 is mounted on the exterior wall 34 of the box 10, as shown in FIG. 1. The temperature gauge displays the temperature inside the box 10 as detected by the sensor 27 located adjacent to the interior wall 35, as shown in FIG. 3. A sensor lead 28 connects the sensor 27 to the gauge 26 by passing through a sensor port 29 in the side wall 36 of the box 10. A commercially available thermometer, such as manufactured by Tel-Tru Mfg., Model No. VT2510SP, is suitable for measuring the sub-zero temperature in the box 10 during operation.

As shown in FIG. 3, the vent port 30 passes through the side wall 36 adjacent to the top wall 37. A conduit elbow 31, shown in detail in FIG. 5, is connected to the vent port 30 outside the box 10. The elbow 31 is turned downward to direct the exiting cryogen toward the floor and thus away from any nearby personnel. The vent port 30 allows excess vapor to exit during operation when the cryogen is introduced into the box 10 so that the box 10 is maintained at substantially atmospheric pressure. Locating the vent port 30 near the top wall 37 permits the warmer vapor to rise and exit while the colder vapor remains in the box 10.

Figure 2:
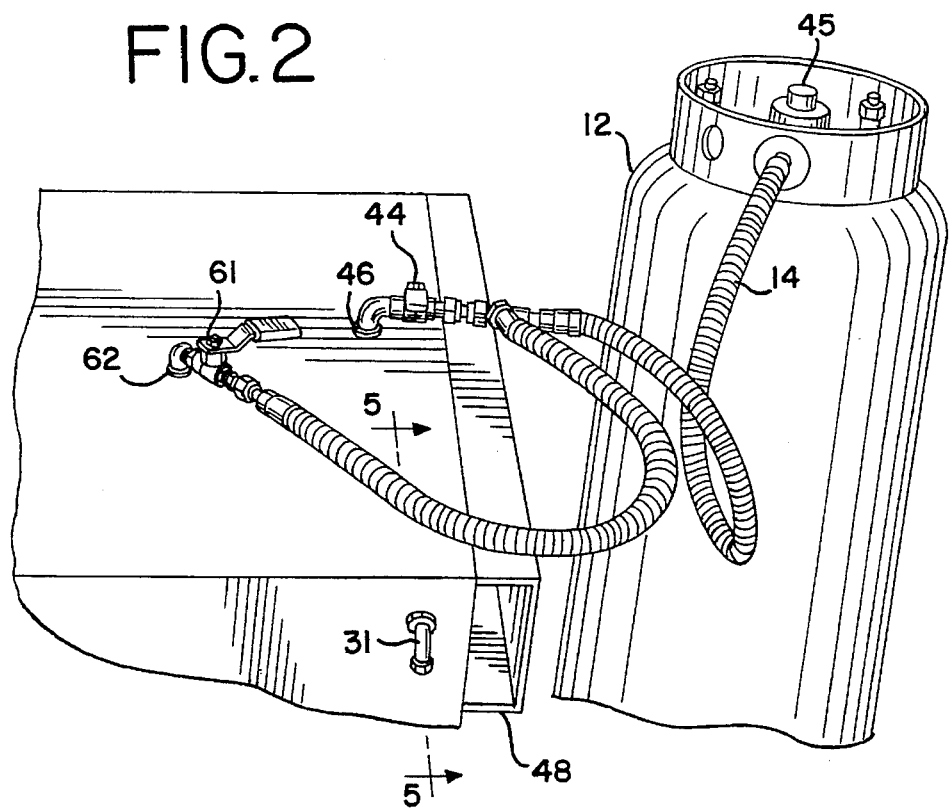
FIG. 2 is an enlarged perspective view of the apparatus of FIG. 1 showing the interconnecting hose detail.

The insulated box 10 in this preferred embodiment includes two cryogen sprayers 38 and 63. A first cryogen sprayer 38 comprises two tubing coils 40, a cryogen supply header 39, a cryogen inlet port 46 and a cryogen supply valve 44. The tubing coils 40, shown in FIGS. 3 and 4, are each located on an opposing side wall 36 and held in position by coil supports 42. Each coil 40 has a plurality of spray ports 41 spaced at various intervals along the length of the coil 40 and positioned to widely disperse the cryogen towards the center of the box 10. Preferably, the spray ports 41 are simple holes in the tubing coils 40, but may also be spray nozzles. Each coil 40 is connected by a cryogen supply header 39 to a common cryogen inlet port 46. The cryogen inlet port 46 passes through the top wall 37 and connects to the supply valve 44 (FIG. 2).

This embodiment of the present invention also includes a second cryogen sprayer 63 that comprises a tubing ring 64, a cryogen inlet port 62 and a cryogen supply valve 61. The tubing ring 64 is centrally located on the top wall 37. The ring 64 has a plurality of spray ports 41 spaced along the length of the ring 64 and directed down towards the center of the box 10. These spray ports 41 may also be equipped with spray nozzles. The ring 64 is connected to a cryogen inlet port 62 that passes through the top wall 37 and connects to a supply valve 61 (FIG. 2).

The cryogen sprayers 38 and 63 may be fashioned from a wide variety of materials that may withstand low temperature service. Preferably, copper tubing is used for economic reasons, but piping and ducting may also be considered. The sprayers 38 and 63 may be installed in a variety of configurations. Of primary importance is that the sprayer 38 adequately disperse or circulate the cryogen into the interior of the box 10. Sprayer 63, functioning much like a shower head, is installed to direct a flow of cryogen into an open container placed directly beneath the sprayer 63.

The sprayers 38 and 63 shown in FIGS. 3 and 4 represent a preferred embodiment. The two side tubing coils 40 are simultaneously operated from a first supply valve 44 and the tubing ring 64 is independently operated from a second supply valve 61. This configuration permits a separate spray of cryogen to be directed into the interior of an open container placed directly below the ring 64 on an as-needed basis, such as when an relatively excessive amount of residue is present in the container to be cleaned. The supply valves 44 and 61 are for on-off service, and any one of the variety of commercially available quarter-turn valves rated for cryogenic service is adequate.

The cryogen storage tank 12 contains liquid cryogen. The tank 12 includes a cryogenic expansion valve 45 for regulating the flow of cryogen and expanding the liquid cryogen into a cold vapor at the lower pressure seen at the outlet of the valve 45. The tank 12 may be any variety of commercially available cryogenic storage tanks that typically are supplied by cryogenic gas suppliers, such as a Dewar flask.

Likewise, the interconnecting cryogen hose 14 may be any variety of commercially available flexible hose for cryogenic service. The hose 14 connects the liquid cryogen tank 12 to the supply valves 44 and 61 on the insulated box 10.

Figure 9:
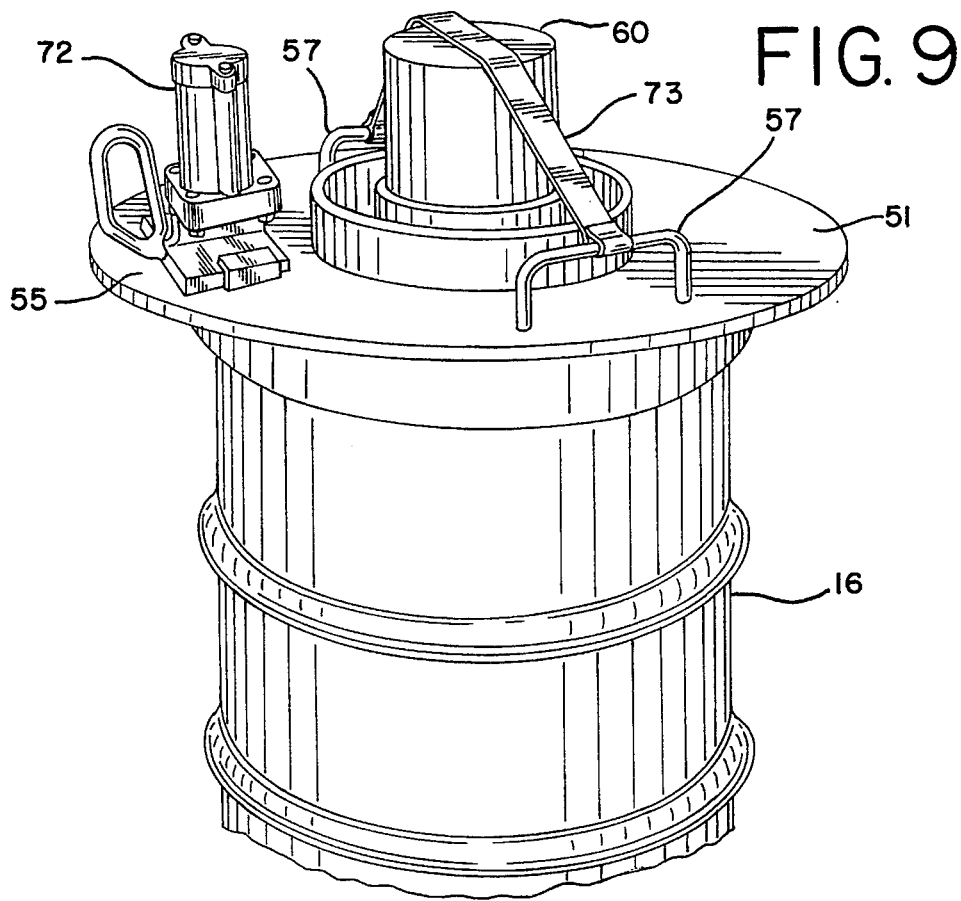
FIG. 9 is a perspective view of another embodiment of an impacting device in operation with the preferred receptacle cover of FIG. 6.

The impacting device 70 may be any variety of instrument capable of delivering a quantum of mechanical force to an object when striking or contacting the object. One embodiment of such an instrument is a rubber mallet 70, as shown in FIG. 6. It is anticipated that an industrial vibrator 72, as shown in FIG. 9, may also be used. Preferably, it is envisioned that the vibrator 72 should be affixed to the cover flange 55 and a strap 73 placed over the container 60 and connected to the cover handles 57. In this manner, the container 60 should be in tight physical coupling with the cover 51 to receive vibrations transmitted from the vibrator 72. The instrument of choice depends on a subjective preference of the user of the present invention. Factors influencing the choice will become apparent from the detailed description below of the method of cleaning residue from a container according to the preferred embodiment of the invention.

Figure 7:
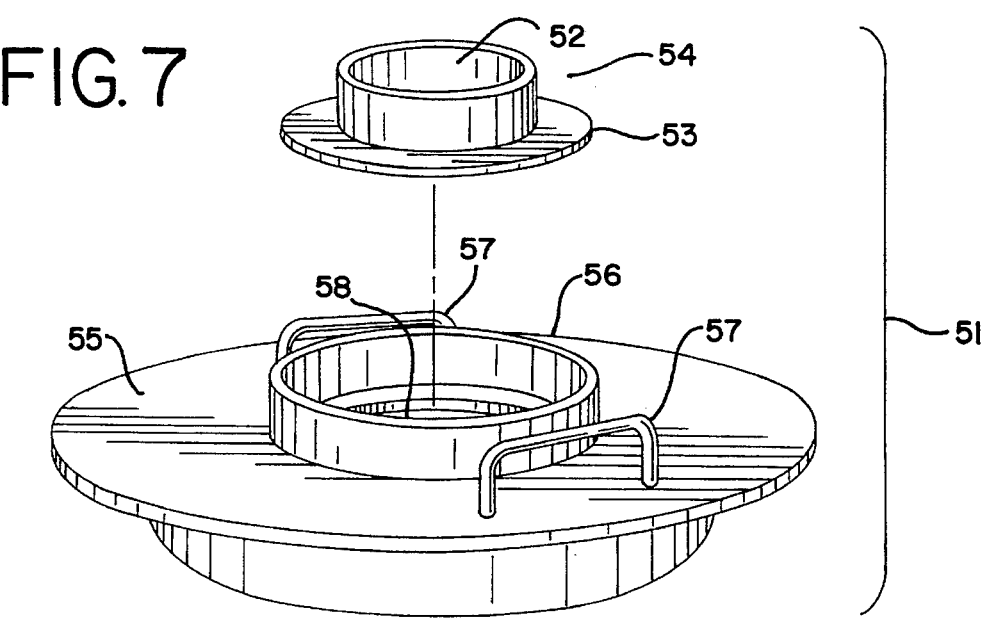
FIG. 7 is an exploded perspective view of the receptacle cover of FIG. 6.

FIGS. 6 and 7 show one preferred embodiment of a residue receptacle 16. The residue receptacle 16 shown is a standard 55 gallon drum and receives the residue separated from the surface of the container 60. The residue receptacle 16 includes a cover 51 particularly suited for operation in cleaning a five gallon container (not shown) and a one gallon container 60. The receptacle cover 51 includes a five gallon container adaptor ring 56 and a one gallon container adaptor ring 54 sized accordingly for a standard cylindrical container of about that volume. The cover 51 may also include a series of interchangeable adaptor rings sized to receive a container of other preselected volumes. The five gallon adaptor ring 56, having an inside diameter of 12⅝ inches, is mounted on a base flange 55 having an opening 58 and two handles 57. The one gallon adaptor ring 54, having an inside diameter of 7⅜ inches, is mounted on a base flange 53 having an opening 52. The flange 53 is sized to concentrically fit within the five gallon adaptor ring 56.

Figure 8:
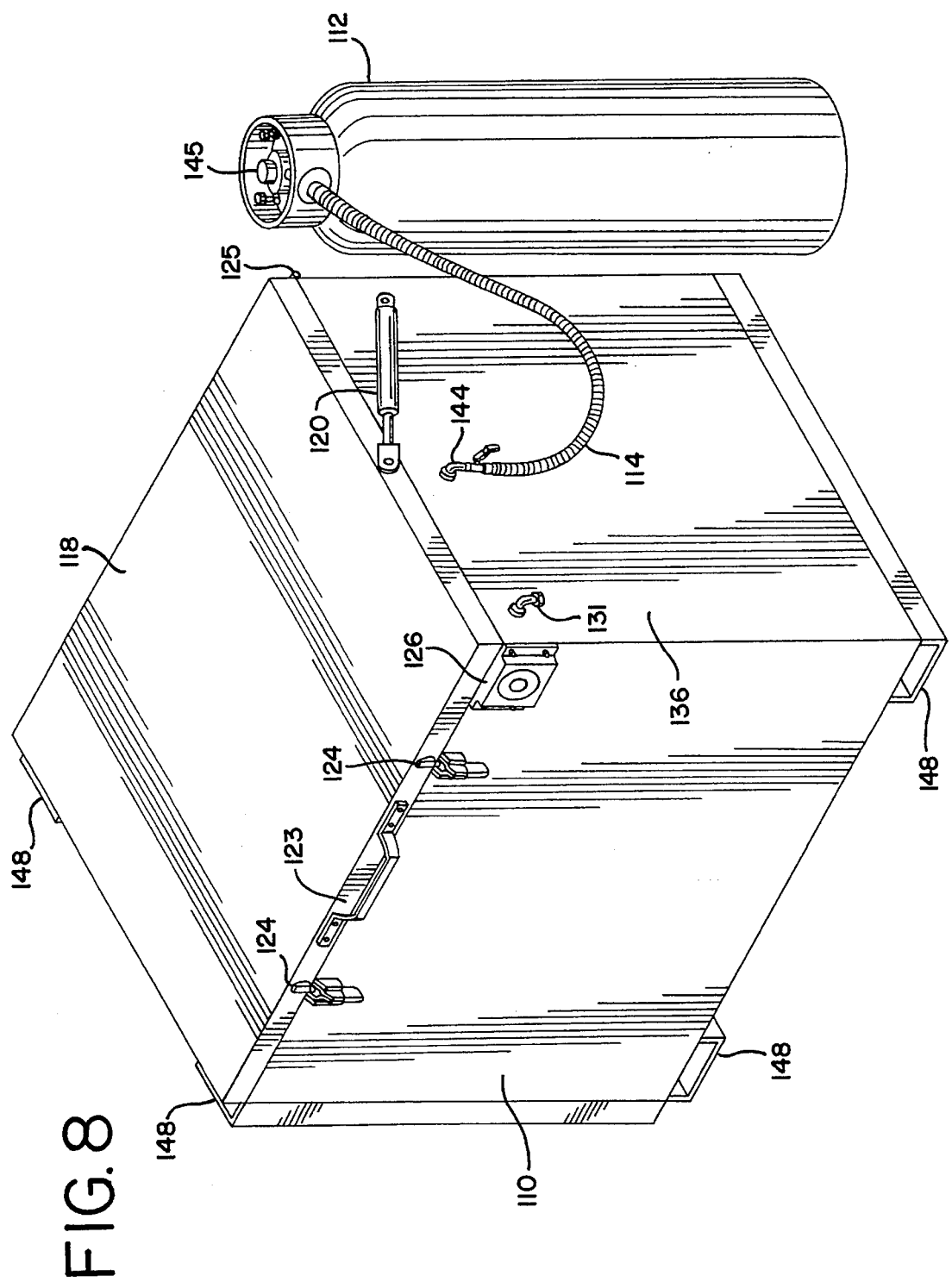
FIG. 8 is a perspective view of a second embodiment of the apparatus of the present invention including an insulated box having a top opening.

FIG. 8 shows a second preferred embodiment of the insulated box 110. The features of this embodiment of the insulated box 110 are substantially the same as the features of the first embodiment of the insulated box 10 (FIGS. 1 through 5). For this reason, the reference numbers used for the elements in FIG. 8 are greater by an addend of 100 than the reference numbers used on the corresponding elements in FIGS. 1 through 5. In this second embodiment, the opening 122 is on the top of the box 110. The door 118 is pivotably mounted on the back wall 150 using hinges 125 so that the door 118 lifts open from the front of the box 110 where the handle 123 is located on the door 118. Two gas springs 120, mounted on opposing sides of the door 118, movably connect the door 118 and the side walls 136. The gas springs 120 assist in lifting the door 118 to an open position. Gaskets 175 (described in detail below and shown in FIG. 11) are placed around the perimeter of the opening 122 of the box 110. The arrangement of the first cryogen sprayer (not shown) generally conforms with that shown in FIGS. 3 and 4. However, a second cryogen sprayer corresponding to sprayer 63 in FIG. 3 is not present in this embodiment.

It may be desirable to place more fork lift pockets 48 on other walls so that the a uniformly constructed box 10 may be transported or adapted for use in different positions, such as by locating two fork lift pockets 48 along the bottom wall 49 and two along the back wall 50.

Alternatively, the insulated box 10 may be embodied in a shape substantially different than depicted in the figures or have openings substantially different. For example, the box 10 may have a substantially cylindrical shape with an opening on the top or on the side. Also, the box 10 may have an irregular shape designed to fit the shape of an irregular shaped container to be treated in it. Likewise, the box 10 may be quite large, such as a semi-trailer, capable of holding a plurality of large and/or small containers. Further, the box 10 may be opened by separating the two halves of a box split along a joint running down its middle.

Figure 11:
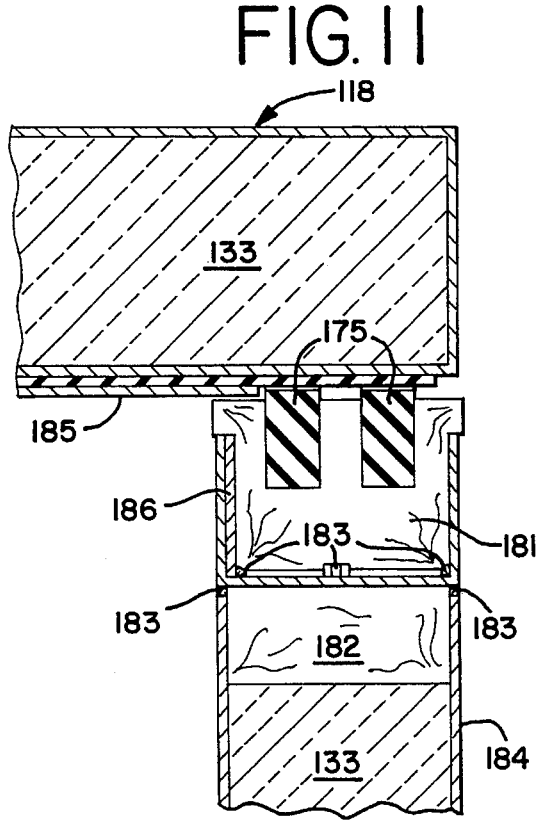
FIG. 11 is an enlarged cross-sectional view taken along line 11—11 of FIG. 8 showing the detail of the gasket.

Due to the cold operating temperatures in the insulated box 10, special gasketing arrangements are needed to enable the gaskets to maintain resiliency and provide sealing capability at the low temperatures. For the insulated box 110 shown in FIG. 8, a gasketing arrangement as shown in FIG. 11 is preferred. This arrangement includes two parallel silicone gaskets 175 capable of withstanding temperatures down to −260° F. (−160° C.) with a durometer rating of 30 placed within grooves along the entire perimeter of the box jamb 184. The box jamb 184 includes a metal channel 180, thermal breaks 186, wood fillers 181 and 182, and caulking 183. The box jamb 184 is designed to reduce the transmission of the interior cold temperature to the silicone gaskets 175. A thermal break 185 is also placed on the interior surface of the door 118.

Figure 10:
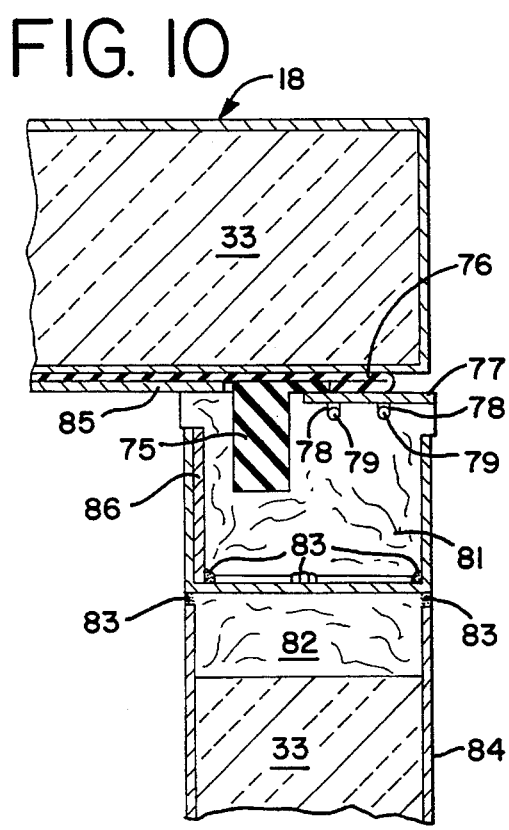
FIG. 10 is an enlarged cross-sectional view taken along line 10—10 of FIG. 1 showing the detail of the gasket.

For the insulated box 10 shown in FIGS. 1 through 5, a gasketing arrangement as shown in FIG. 10 is preferred. This arrangement includes one silicone gasket 75 capable of withstanding temperatures down to −260° F. (−160° C.) with a durometer rating of 30 placed within a groove along the entire perimeter of the box jamb 84. The box jamb 84 includes a metal channel 80, thermal breaks 86, wood fillers 81 and 82, and caulking 83. The box jamb 84 is designed to reduce the transmission of the interior cold temperature to the silicone gasket 75. The box jamb 84 also includes two calibrated resistance wires 79, preferably 9 gauge, placed within two parallel grooves 78 in the wood filler 81 around the entire perimeter of the box jamb 84. The wires 79 are connected in a parallel circuit, with a setting at 30 volts, 6.40 amps resulting in a wire temperature of approximately 190° F. (88° C.) based on 25 lineal feet of 9 gauge calibrated resistance wire when used in an insulated box 10 sized to receive one 55 gallon container. A 10 gauge aluminum plate 77 is placed directly over the wires 79 around the entire perimeter of the box jamb 84 to conduct heat to a silicone gasket 76 mounted on the door 18. The silicone gasket 76 is rated for use with the heated calibrated wires 79. A thermal break 85 is placed on the interior surface of the door 118.

Alternatively, when the embodiment of the insulated box 10 shown in FIGS. 1 through 5 is intended for only intermittent operation, than the gasket arrangement embodied in FIG. 11 may be suitable. Such intermittent operation would be limited to periods of about one hour continuous operation with the lowest operating temperature about −240° F. (−150° C.).

A preferred embodiment of the method of the present invention may be most expeditiously described by reference to the afore-mentioned preferred embodiment of the apparatus. A container 60 may be cleaned cryogenically by placing the container 60 having residue adhered to its surface into an insulated box 10, placing a cold vaporized cryogen into the insulated box 10 such that it contacts and cools the container 60 and residue, removing the container 60 from the insulated box 10 after the residue has cooled to a temperature that renders it substantially embrittled, impacting the container 60, the energy of which fragments the residue and separates it from the surface of the container 60, and then removing the separated residue leaving a substantially residue-free cleaned container.

The present invention may be applied to clean a wide variety of residues of expended commodities from commodity containers. These residues include, but are not limited to tars, lubricants, mastics, inks, coatings, solvents, adhesives, glues, sealants, varnishes, paints, paint pigments, enamels, resins, plasticized materials, greases, cementatious materials, etc. The present invention may be applied to containers having a combination of different residues adhered to its surface. The residues may be fresh, that is, in their commonly useful form, liquid, viscous, or tacky. Also, the residues may have a dried surface film. Moreover, the present invention may be applied to residues that have become dried, solidified or baked-on. Generally, the present invention works quickly with residues that thinly coat the surface of the container, but also may be effective where the residue is several inches thick, or greater. Typically, the present invention is directed towards cleaning the inside surfaces of containers, but, as will become apparent from the following detailed description, can also clean the outside surfaces.

The present invention may be applied to commodity containers made from metal, plastic, polymers, resins or a composite of different materials. The present invention may substantially remove the residue from the container so that the container may be re-used or meet government requirements for non-hazardous waste disposal. The containers preferably range in size between about 85 gallons and about one gallon. The method of the preferred embodiment is particularly well suited for commonly used containers of fifty-five, five and one gallon volume. Most preferably, the containers have a substantially cylindrical shape with a full opening at one end. The residue may be removed easiest from such a container, but the present invention may be effective on other containers, such as those having tight corners and a small opening.

According to the preferred embodiment, the residue laden container 60 is placed in an insulated box 10. More than one container 60 may be placed in the box 10 if space permits. The insulated box 10 contains the cold vapor in a small space so it may be efficiently utilized to cool the containers 60 and residue. The containers may be placed alone, or with a multitude of other containers, into the insulated box 10. The box 10 is then sealed closed and cryogenically cooled.

Cryogens are generally gases that have a very low boiling point. Nitrogen ($N_2$), for example, has a boiling point of −320° F. (−195° C.) at atmospheric pressure. The cryogens may be readily stored as a liquid in specially designed storage tanks 12. A range of liquid cryogens, or cryogenic agents, or cryogenic gases are commercially available that theoretically could be used with the present invention. These include, but are not limited to, Nitrogen, Helium, Argon, and Carbon Dioxide. However, some cryogenic gases are flammable or require extreme precautions and equipment to safely use, and are therefore not preferred. Nitrogen is a preferred cryogen because of its relative safety in use and economical low cost. Nitrogen is an inert gas that is not flammable, is non-toxic and does not raise a risk of reaction with residue or equipment materials. Nitrogen is the largest constituent of air so it can safely dissipate into the environment. Special safety equipment is not required when using Nitrogen cryogen with the present invention, other than minor protective gear for the cold temperatures. However, a large, well ventilated room is preferred for using the present invention to avoid Oxygen deprivation due to the vaporized Nitrogen cryogen displacing the air from the room.

Preferably, a cold vaporized cryogen is placed in the insulated box 10 to contact and cool the containers 60 and residue. Most preferably, the box 10 is pre-cooled prior to placing the containers 60 therein by introducing the vaporized cryogen into the empty box 10 for a short period of time, such as 10 to 20 minutes, to reduce its temperature. Typically, the internal environment of the box 10 may be pre-cooled down to a temperature of about −150° F. (−100° C.) or less as measured on the temperature gauge 26. The colder the pre-cool, the less time required to cool the containers 60 and residue.

As an alternative, it may be more economical to use standard refrigeration equipment to pre-cool a large insulated box instead of using cryogens. For example, when the insulated box is the size of a semi-trailer, it is economical to operate refrigeration equipment to maintain a pre-cooled box and only use the cryogen after containers are placed inside the box.

After the containers 60 are in the insulated box 10, the door 18 is sealed closed and the latches 24 are set, then the cryogen, preferably Nitrogen, is introduced by opening a supply valve 44 and expansion valve 45 on the liquid cryogen storage tank 12. Liquid Nitrogen is under about 22 psig pressure in Dewar flask 12 and expands into a vapor as it drops to substantially atmospheric pressure across the valve 45. Thus, the cold vaporized cryogen flows through the cryogenic hose 14, through the open valve 44, through the tubing coils 40, exits through the spray ports 41, enters the interior of the box 10 and contacts the residue and containers 60. Preferably, for most applications, the cryogen is completely vaporized before exiting the spray ports 41. This maximizes the efficient usage of cryogen, as well as reducing hazards from personnel being exposed to liquid cryogen. Thus, any liquid cryogen accumulating at the bottom of the box 10 generally is wasteful and not desired. Therefore, if the operating temperature of the box 10 is allowed to get too low, such as less than about −260° F. (−160° C.) when using Nitrogen, then the cryogen may not completely vaporize before exiting the coils 40.

However, certain situations may require that liquid cryogen be introduced into the box 10. When a container has very thick residue inside it, it may be desired to spray liquid cryogen from the sprayer 63 directly into the interior of the container and onto the thick layer of residue to effect rapid and concentrated cooling there. Sprayer 63 is designed with a short flow path to minimize the amount of vaporization occurring therein, so that some liquid cryogen may exit from the ring 64 even though the box operating temperature is not so cold as to allow liquid cryogen to exit from the coils 40.

Less preferably, though, the system could be designed to spray atomized liquid cryogen on the containers and residue from all the sprayers. But, this may result in accumulations of liquid cryogen in the bottom of the box 10.

The residue rapidly changes properties as it rapidly cools. It is theorized that the residue thermally contracts as it cools at a different rate than the container and that this differential contraction lessens the adhesive bonds between the residue and the surface of the container 60. Water-based residue typically expands when it solidifies, but the differential movement of the residue and surface of the container 60 would still be present. In addition, if not already solid, the residue solidifies and becomes substantially embrittled as it cools to sub-zero temperatures. It is believed that even if the residue and container materials have similar rates of thermal contraction, the embrittlement of the residue lessens the adhesive bonds between the residue and the container.

The residue laden containers 60 should remain in contact with the cold cryogen until at least nearly all of the residue becomes substantially embrittled. The time required to embrittle the residue depends on several factors such as the thickness of the residue and the operating temperature in the box 10. Also, other factors include, but are not limited to, the type of residue material being cleaned, the type of container material (as certain materials conduct heat faster than others), the quantity of containers cooled at the same time, the quantity of residue, the pre-cool temperature of the box as well as the type of cryogen used.

The cooling time and operating temperature are interdependent. The residue is not required to cool to the selected operating temperature. Rather, the lower temperatures will result in faster heat transfer rates and reduce the amount of time required to embrittle the residue. Thus, economic trade-offs are involved in the selection of the operating temperature. Lower temperatures and shorter cooling times will require the use of more cryogen. On the other hand, higher temperatures and longer cooling times will correspondingly increase labor costs.

Subject to the foregoing, for most applications, lower temperatures and faster cooling times are preferred. This can be accomplished by introducing sufficient cold vaporized cryogen into the insulated box 10 with containers 60 inside to maintain a temperature of between about −100° F. (−75° C.) and about −300° F. (−185° C.). Preferably, the temperature will be maintained between about −150° F. (−100° C.) and about −250° F. (−155° C.).

During the cooling step, as the temperature in the box rises above its desired value, more cryogen should be introduced to lower the temperature back to the desired value. This may be accomplished by manually adjusting the valve 45 or by using an automatic temperature controller regulating a cryogenic control valve. Maintaining the internal environment of the insulated box within the most preferred temperature range for a period of about 4 to about 6 minutes will sufficiently embrittle thin coatings of most residues. Of course, this time may vary depending on several factors. Thick layers of residue will require more cooling time. For example, a six inch layer of a coating material may require up to about 15 to 20 minutes of treatment time.

After sufficiently cooling the residue laden containers 60, the box 10 is opened and the containers are removed for impacting one at a time. The door 18 is closed after the removal of each container to keep the containers remaining in the box 10 cool. The removed container is impacted before any substantial warming can occur. The impact causes the embrittled residue to fragment into small pieces and separate from the surface of the container 60. The expected embrittlement is of a degree such that several manual blows to the outside of the container 60 with a rubber mallet will suffice to fragment and separate substantially all of the residue. If the residue does not separate after a few strikes, then the container 60 may be placed back into the cold box 10 to cool the residue, further embrittling it and weakening the adhesive forces bonding the residue to the container surface.

It is apparent that if the containers are to be re-used after cleaning, then the containers should not be left in the cold box 10 for too long a period. Although the residues typically become embrittled at a higher temperature than does the container 60, plastic will become embrittled at a higher temperature than metal. If the container gets too cold and becomes substantially embrittled, as may happen with a shorter cooling time for plastic containers than for metal containers, then the impacts to remove the residue may also fracture embrittled portions of the container. This would render the container unfit for re-use after cleaning.

Presuming that the container 60 and residue have been properly cooled, there are a variety of methods that may be used to impact the container 60. A hard object, such as a rubber mallet 70, may be manually struck against the exterior of the container 60. Conversely, the container 60 may also be struck against a hard object. Also, it is anticipated that an industrial type vibrator 72 may be used. The vibrator 72 would impart a series of consecutive small impacts to the container. Likewise, the vibrator 72 may induce internal vibrations in the residue and container 60 causing the residue particles to impact each other and the container. In brief, it is believed that impacting applies mechanical energy to the container 60 greater than the embrittled residue can absorb, resulting in the physical failure of the solidified residue and the bonds to the container surface. The physical failure results in fragmentation and separation of the residue from the container surface.

Preferably, the residue is removed by impacting the container in conjunction with placing it in an inverted position over a residue receptacle 16. As the impact loosens and breaks apart the residue, the residue fragments fall by gravity into the receptacle 16. For example, as shown in FIG. 6, a one gallon container 60 is removed from the insulated box and placed upside down within the adaptor ring 54 of the receptacle cover 51 which is positioned over the residue receptacle 16 opening. The container 60 is then struck on the sides and the bottom with a rubber mallet 70. Substantially all of the residue fragments and separates from the surface of the container 60. The residue particles in the interior of the container then fall through the receptacle cover opening 52 into to the receptacle 16. Any residues that separated from the exterior of the container fall onto the receptacle cover 51 and is manually placed into the receptacle 16.

Alternatively, particularly with large containers, such as an 85 gallon drum, the residue receptacle may be a large plastic sheet, or a large shallow pan. The residue would be removed, in this case, by turning over the drum with the open end on the sheet. The container would be impacted with a rubber mallet to fragment the residue and separate it from the container surface. The residue particles would fall onto the sheet. The sheet could later be gathered to transfer the residue particles into a more appropriate storage vessel.

As an example of cleaning residue from containers, five-gallon metal containers were cleaned under the following conditions. The insulated box 10 was pre-cooled to −150° F. (−100° C.) using the cold cryogenic vapor from a cryogenic storage tank filled with liquid Nitrogen. Twelve residue laden five-gallon metal containers were placed in the insulated box 10. The residue consisted of a water-based baking enamel chem-aqua series sold by Sherwin Williams. The residue was partially solidified in some cases, having an average thickness of less than one-eighth inch, adhered to the interior surface of the containers. The Nitrogen was introduced into the box intermittently to maintain a temperature of −150° F. (−100° C.) for a period of 5 minutes. After this cooling period, the containers were removed from the box 10 one at a time and placed on a receptacle cover 51 set up for a five gallon size container. Each container 60 was impacted several times to the sides and the up-turned bottom with a rubber mallet 70 for less than 30 seconds. Substantially all of the residue was removed from the container so that the containers were cleaned for re-use.

A similar method may be followed to cryogenically reduce the bulk volume of a plastic container 60. The difference according to this method, is that the container 60 remains in the insulated box 10 until the container 60 cools to a temperature such that substantial portions of the container 60 become embrittled. After removing the plastic container 60 from the insulated box 10, sufficient stress should be applied to the container 60 to fracture the embrittled portions, thereby causing the container 60 to break apart. The bulk volume of the broken portions of the container is substantially less than the container's original bulk volume.

Typically, the temperature at which a plastic container becomes embrittled is significantly less than the temperature at which residue becomes embrittled. Thus, to cool the container to a lower temperature, it may be necessary to keep the container in the insulated box 10 for a longer period of time if operating at the same temperature as for cleaning residue. Numerous factors affect the amount of time required for the appropriate cooling. These factors include the number of containers being cooled at one time, the type of container material, the thickness of the container, the size of the container, the pre-cooled temperature in the box before placing the containers therein, and the operating temperature maintained during cooling.

Subject to the above factors and the previously described economic trade-offs in the operational time-temperature interdependency, for most size reduction applications, preferably the temperature in the box 10 is maintained between about −200° F. (−130° C.) and about −250° F. (−155° C.).

After cooling, the plastic container is removed from the box and stressed to the point of fracture. The stress may be applied in different ways. The container may be impacted by a heavy object. The container may strike a hard object. Compressive forces may be applied to the container. Numerous commercially available equipment for compacting waste applies the type of compressive force required to fracture and break apart the embrittled container. For example, Drum Crusher In-Plant Model No. 7000 manufactured by Drumbeaters of America Inc., is an example of a suitable container compactor. A plastic container that would otherwise rebound to its original shape after compacting is broken apart by this embodiment of the present invention so that it maintains the compressed bulk volume.

As an example, a fifty-five gallon container made from polyethylene, HDPE No. 2, was placed in an pre-cooled insulated box 10. Vaporized Nitrogen was then introduced into the box 10 intermittently to maintain it at −200° F. (−130° C.). After about ten minutes, the container was removed and placed in a compactor that fractured the container, breaking it apart and crushing it.

One aspect of the invention is also directed to a method for cryogenically cleaning residue from containers and reducing the bulk volume of the containers. This method combines the previously described method for cleaning residue from containers and the method for reducing the bulk volume of the containers. This method may be practiced by first cryogenically cooling the containers to a first temperature sufficient to clean the residue therefrom, cleaning out the residue, and then cryogenically cooling the containers a second time to a lower second temperature sufficient to embrittle the container for breaking it apart to reduce its bulk volume.

Alternatively, this method may be practiced by performing only a single cooling step and a single impacting step. Here the method for cryogenically treating a container for reducing its bulk volume is operated on residue laden containers. Upon applying force to break apart the container, the residue fragments and separates from the container as the container fractures and breaks apart. Conventional separation methods then may be applied if desired to segregate the residue fragments from the container pieces.

The present invention may also find broader application, such as in reducing the bulk volume of metal containers. It is anticipated that the present invention may be effective to reduce the bulk volume of metal containers using substantially less force to compact the container than otherwise required. For instance, after a metal container is cooled to become substantially embrittled, stress applied to it will cause it to fracture and break apart. It is expected that the metal container may be compacted by a compacting device that did not have sufficient compressive force to compact the metal container when it was at ambient temperature. Likewise, an impact from a sledge hammer, that may only dent a metal container at ambient temperature, is expected to fracture the same container into numerous small pieces when the container is cooled to a low temperature where the metal becomes embrittled.

As a foreseeable application, a standard propane bottle may be cryogenically treated by placing it the insulated box 10 maintained at −250° F. (−155° C.) by intermittent sprays of vapor from a Nitrogen cryogenic tank 12 for a period of about 10 minutes. When the propane bottle is sufficiently embrittled, it would be removed from the insulated box 10 and placed in a compactor, for example, Drum Crusher Portable Model No. 8000, manufactured by Drumbeaters of America Inc. Typically, it is presumed that a commercially available steel propane bottle at ambient temperatures may have sufficient strength to withstand more than 100,000 pounds of compressive force. This particular compactor is capable of delivering 100,000 pounds of compressive force which is expected to be sufficient to crush the embrittled propane bottle.

The advantages of the preferred embodiments are numerous. The preferred embodiments avoid the use of solvents and other wash liquids associated with traditional cleaning methods so that the amount of hazardous material for disposal is limited to the original residue itself. Moreover, the residue may be recycled or re-used since it is not contaminated by wash liquids or solvents.

The described methods require less equipment and less labor to operate than traditional methods of cleaning and reduces health risks to the employee. The described methods are more economical than traditional cleaning methods. The preferred embodiments substantially remove the residues from the container to meet government disposal requirements and industry requirements for re-use or recycle of the container.

In addition, aspects of the invention allow plastic containers to be reduced in bulk volume using traditional equipment and methods for metal containers. Plastic containers may be effectively reduced in bulk volume without the need for dangerous and expensive shredding equipment.

The preferred apparatus of the present invention includes a sealed insulated box to safely contain the low temperatures during the cooling operation. Moreover, because the preferred embodiment of the invention applies vaporized cryogens for cooling, the hazards and inefficiencies of using exposed liquid cryogens are avoided.

It should be appreciated that the methods and apparatus of the present invention are capable of being incorporated in the form of a variety of embodiments, only a few of which have been illustrated and described above. The invention may be embodied in other forms without departing from its spirit or essential characteristics. For example, impacting of the containers could be carried out while the containers are still in the insulated box. Also, rather than a hinged door as shown, other arrangements for opening and closing the box 10 may be used. The described embodiments are to be considered in all respects only as illustrative and not restrictive, and the scope of the invention is, therefore, indicated by the appended claims rather than by the foregoing description. All changes which come within the meaning and range of equivalency of the claims are to be embraced within their scope.

We claim:

1. A method for cleaning commodity containers by removing residue of expended commodity from the surface of the containers comprising the steps of:
    (a) cooling the container and the commodity residue to effect substantial embrittlement of the residue adhered to the surface of the container; and
    (b) impacting the container to fragment the residue on the interior of the container and cause it to separate from the surface of the container.

2. A method according to claim 1 wherein the cooling step is carried out by placing the container in an insulated box.

3. A method according to claim 1 wherein the cooling step is effected by contacting the container and residue with a cryogen.

4. A method according to claim 3 wherein the cryogen is vaporized prior to contacting the container.

5. A method according to claim 3 wherein the cryogen has a boiling point of less than $-100°$ F. ($-75°$ C.) at atmospheric pressure.

6. A method according to claim 3 wherein the cryogen is Nitrogen.

7. A method for removing residue of expended commodity from the surface of commodity containers comprising:
    (a) placing at least one container laden with residue of expended commodity on the interior surface of the container and vaporized cryogen inside a box;
    (b) contacting the container and residue with cold cryogen for a period of time sufficient to effect substantial embrittlement of the residue adhered to the surface of the container;
    (c) removing the cooled container from the box;
    (d) impacting the container with sufficient force to fragment a substantial portion of the residue and effect its separation from the surface of the container; and
    (e) removing the residue fragments from the container.

8. A method according to claim 7 wherein the cryogen is placed in the box after placing the container in the box.

9. A method according to claim 7 wherein the cryogen is placed in the box both before and after placing the container in the box.

10. A method according to claim 7 wherein a sufficient supply of cryogen is placed in the box at substantially atmospheric pressure to reduce the temperature inside the box to about less than $-150°$ F. ($-100°$ C.).

11. A method according to claim 7 wherein the method further comprises after step (c) placing the cooled residue laden container in an inverted position over an open residue receptacle, impacting the container by a series of mechanical strikes to the external surfaces of the container, and removing the residue fragments gravitationally into the residue receptacle.

12. A method according to claim 11 wherein the impacting is effected by a vibrator.

13. A method according to claim 7 wherein the container has a volume of between about 85 gallons and about 1 gallon.

14. A method according to claim 7 wherein the container has a volume of between about 5 gallons and about 1 gallon and a substantially cylindrical shape.

15. A method for reducing the bulk volume of containers, the containers being made of material that has a tendency to rebound to its original shape the method comprising:
    (a) cooling the container, while the container is substantially in a useable shape, to effect substantial embrittlement of at least a major portion of the container; and
    (b) stressing the container to fracture and break apart the embrittled portions of the container thereby reducing the bulk volume of the container.

16. A method according to claim 15 in which the stressing is effected by impacting the container.

17. A method according to claim 15 in which the stressing is effected by applying compressive forces to the container.

18. A method for reducing the bulk volume of containers, the containers being made of material that has a tendency to rebound to its original shape, the method comprising:
    (a) placing at least one container while the container is substantially in a useable shape and vaporized cryogen inside an insulated box;
    (b) contacting the container with cryogen for a period of time sufficient to effect substantial embrittlement of at least major portions of the container;

(c) removing the cooled container from the box; and (d) applying stress to the container to fracture the embrittled portions of the container thereby reducing the bulk volume.

19. A method according to claim 18 wherein the container is cooled to a temperature between about −100° F. (−75° C.) and about −300° F. (−185° C).

20. A method according to claim 18 in which the cryogen is placed in the box at substantially atmospheric pressure to reduce the temperature inside the box to about less than −150° F. (−100° C.) prior to placing the container therein.

21. A method according to claim 18 in which the containers have a volume of between about 85 gallons and about 1 gallon.

22. A method for removing residue from a container and reducing the bulk volume of the container comprising the steps of:

(a) cooling a residue laden container for a period of time to effect substantial embrittlement of the residue adhered to the surface of the container and substantial embrittlement of at least a major portion of the container;

(b) impacting the container with sufficient force to fragment a substantial portion of the residue and effect its separation from the surface of the container; and (c) applying stress to the container to fracture and break apart the embrittled portions of the container thereby reducing the bulk volume of the container.

23. A method according to claim 22 in which the cooling is effected by contacting the container with cryogen in an insulated box.

24. A method according to claim 22 in which the impacting is effected by a vibrator.

25. A method according to claim 22 in which the stress is applied by a compactor.

26. An apparatus for cryogenically treating containers comprising an insulated box having an opening sufficiently large to allow placement and removal of at least one container, a plurality of spacers attached to a floor surface of the box to hold the containers off the floor of the box a vent port, a door mounted on the box to seal closed the opening and at least one cryogen sprayer having a plurality of spray ports.

27. The apparatus for cryogenically treating containers of claim 26 wherein said at least one sprayer comprises at least two coils, each coil being mounted on opposite interior side surfaces of the insulated box.

28. The apparatus for cryogenically treating containers of claim 27 further comprising a plurality of independently operable valves mounted on the exterior Of the box, a sprayer mounted on the top interior surface of the box having a plurality of spray ports, separate conduits connecting the valves to the sprayers such that the top-mounted sprayer is operable independently of other sprayers.

29. The apparatus for cryogenically treating containers of claim 26 further comprising a temperature sensor to measure the temperature of the vapor inside the box.

30. The apparatus for cryogenically treating containers of claim 29 further comprising a temperature gauge for displaying the temperature sensed by the temperature sensor, the temperature gauge being mounted to the exterior of the insulated box.

31. The apparatus for cryogenically treating containers of claim 29 further comprising a control valve in communication with the sprayer and a temperature controller receiving a temperature signal from the temperature sensor.

32. The apparatus for cryogenically treating containers of claim 26 wherein the opening is located on the top of the insulated box and a double gasket assembly forms a seal between the door and the box.

33. The apparatus for cryogenically treating containers of claim 26 wherein the opening is located on a side of the insulated box and heated electrical resistance wires are mounted in the box around the opening to heat a gasket assembly.

34. The apparatus for cryogenically treating containers of claim 26 wherein the insulated box is sufficiently large to receive at least one substantially cylindrical container having a volume of about 85 gallons.

35. A system for cleaning a residue laden container comprising:

(a) a tank for the storage of liquid cryogen;

(b) an insulated box having a cryogen sprayer;

(c) a hose interconnecting the tank and the sprayer in the insulated box;

(d) a residue receptacle for receiving the residue located adjacent to the impacting device; and (e) a residue receptacle cover located on the residue receptacle, the receptacle cover having an opening to receive the separated residue falling from an open top of an inverted container placed thereon.

36. The system of claim 36 wherein the receptacle cover is selectively adjustable to receive cylindrical containers with predetermined diameters.

37. The system of claim 36 wherein the receptacle cover includes at least two concentrically fitting adaptor rings, at least one ring sized to accept a 5 gallon cylindrical container having a predetermined diameter, and at least one ring sized to accept a 1 gallon cylindrical container having a predetermined diameter smaller than that of the 5 gallon container.

38. A combination of a commodity container from which the commodity has been expended and a system for cryogenically recovering residue of an expended commodity from such a container; the system comprising an insulated box having an opening sufficiently large to allow placement and removal of at least one commodity container and a supply of cryogen in communication with the box; and the container, having residue of expended commodity adhered to its surface, being positioned within the box.

39. The combination of claim 38 further comprising vaporized cryogen in contact with the residue of expended commodity adhered to the surface of the expended commodity container.

40. The method of claim 1 wherein the impacting is carried out with insufficient force to break the container such that the container is suitable for re-use to contain a commodity.

41. The method of claim 1 wherein step (a) is carried out such that the container does not become substantially embrittled.

42. The method of claim 1 further comprising recycling the removed residue.

43. The method of claim 1 further comprising disposing the removed residue.

44. The method of claim 7 further comprising directing separate, independently operable sprays of cryogen to the exterior of the container and to the interior of the container.

45. The method of claim 7 wherein the impacting is carried out with insufficient force such that the containers do not break.

46. The method of claim 45 further comprising re-using the cleaned container.

47. The system of claim 35 further comprising an impacting device located adjacent to the insulated box for impacting the cooled containers removed from the insulated box to effect fragmentation and separation of the residue adhered to the surface of the container.

48. The system of claim 47 wherein the impacting device is a vibrator operable with the residue receptacle cover.

* * * * *

UNITED STATES PATENT AND TRADEMARK OFFICE
CERTIFICATE OF CORRECTION

PATENT NO. : 5,456,085
DATED : October 10, 1995
INVENTOR(S) : James L. Popp et al.

It is certified that error appears in the above-indentified patent and that said Letters Patent is hereby corrected as shown below:

Column 14, line 48,
In claim 15, line 3 immediately after "shape" insert --,--.

Column 14, line 63,
In claim 18, line 4 immeidately after "container" insert --,--.

Column 15, line 42,
In claim 26, line 5 immediately after the second occurence of "box" insert --,--.

Column 15, line 52,
In claim 28, line 3 delete "Of" and substitute --of--.

Column 16, line 29,
In claim 36, line 1 delete "36" and subsitute --35--.

Signed and Sealed this

Twenty-ninth Day of October 1996

*Attest:*

BRUCE LEHMAN

*Attesting Officer*          *Commissioner of Patents and Trademarks*